UNITED STATES PATENT OFFICE.

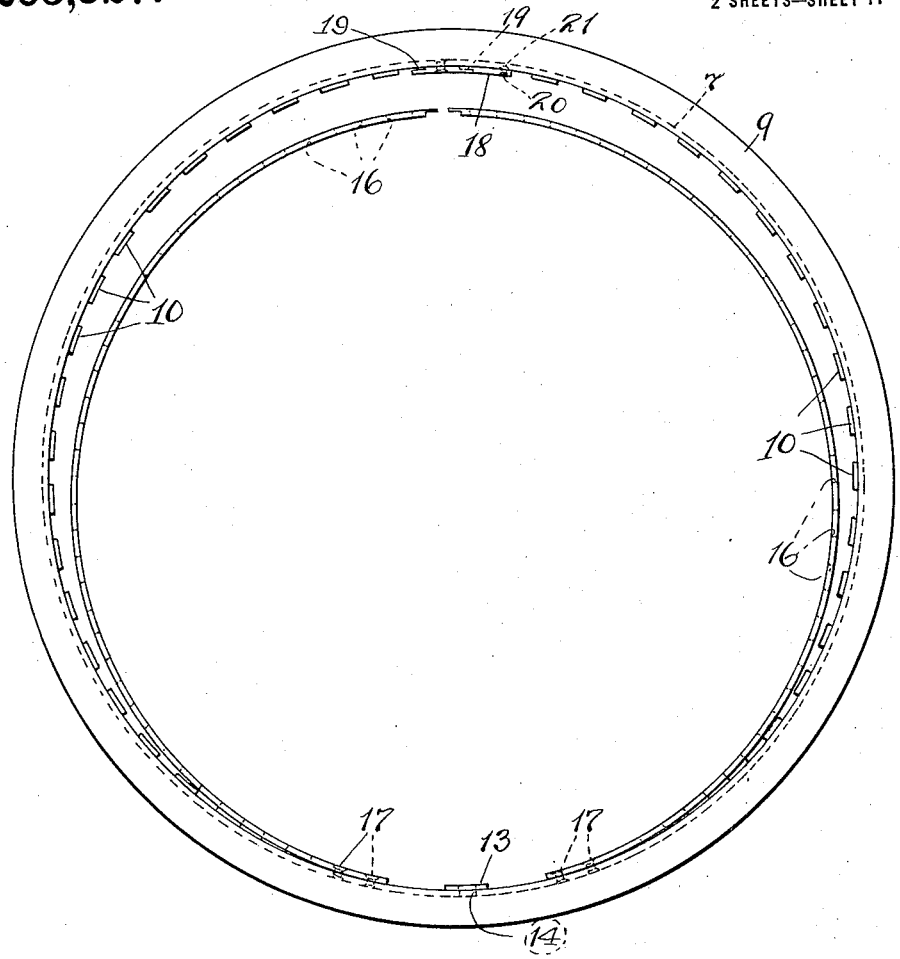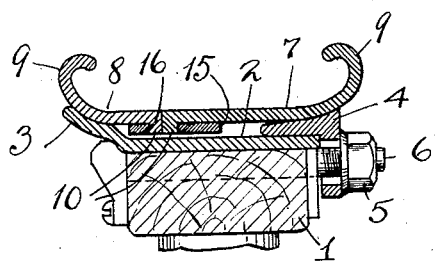

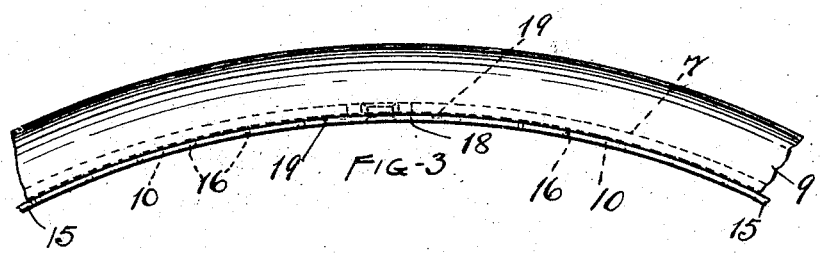
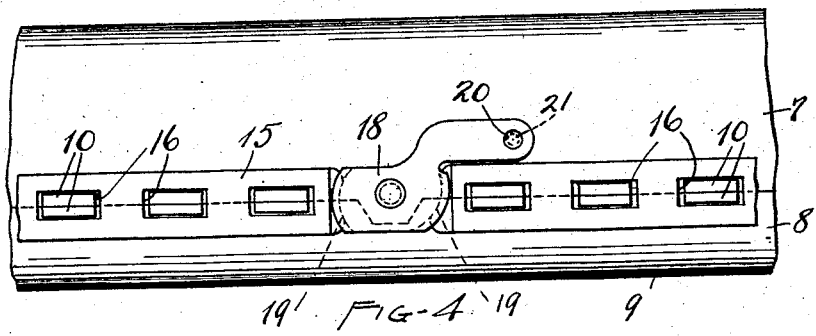
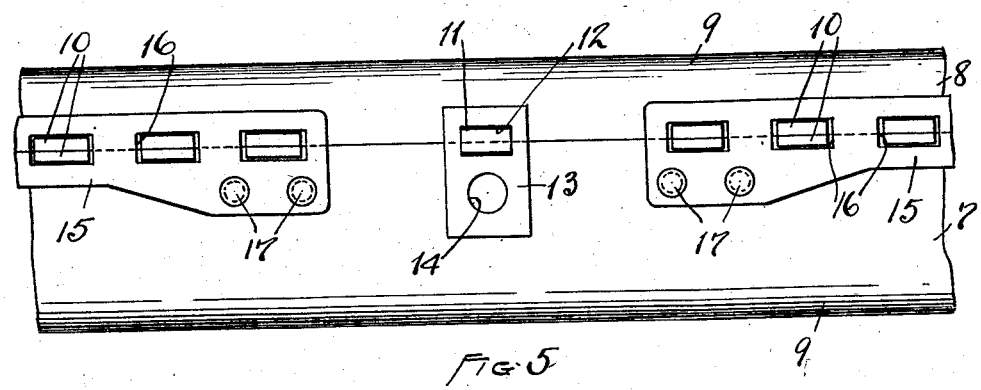
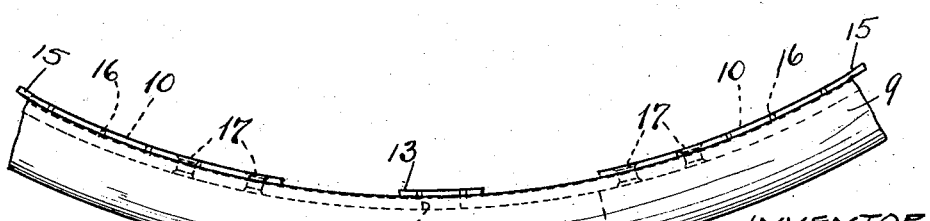

CHARLES W. GRESSLE, OF CLEVELAND, OHIO, ASSIGNOR TO THE STANDARD WELDING COMPANY, OF CLEVELAND, OHIO, A CORPORATION OF OHIO.

RIM FOR VEHICLE-WHEELS.

1,205,527.

Specification of Letters Patent.   Patented Nov. 21, 1916.

Application filed December 22, 1913.   Serial No. 808,109.

*To all whom it may concern:*

Be it known that I, CHARLES W. GRESSLE, a citizen of the United States, and a resident of Cleveland, county of Cuyahoga, and State of Ohio, have invented a new and useful Improvement in Rims for Vehicle-Wheels, of which the following is a specification, the principle of the invention being herein explained and the best mode in which I have contemplated applying that principle, so as to distinguish it from other inventions.

The present improvements, relating as indicated to vehicle-wheel rims, have regard more particularly to rims of the sectional channel type, such as are now generally used with pneumatic tired wheels.

The object of the invention is to provide a combined "quick detachable" and "demountable" rim, where the term "quick detachable" is employed, as in the trade, to designate a rim made up of sections that may be readily separated, or taken apart, in order to remove a tire shoe from the rim, or place one thereon.

The object of the invention is to provide a rim of this construction, in which the sections may be directly separated by the removal of simple locking means, thus much facilitating the removal of the shoe where the latter "freezes" to the rim, as is apt to be the case where a tire has remained in use unchanged for a considerable time.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of the various mechanical forms in which the principle of the invention may be used.

In said annexed drawings:—Figure 1 is a side elevational view of my present improved rim by itself, that is, removed from the wheel felly, showing the section-locking means in inoperative position; Fig. 2 is a transverse sectional view of such rim shown with the locking means in operative position and with the rim mounted in place on the wheel felly; Fig. 3 is a side elevational view, on an enlarged scale of the upper portion of the rim, as shown in Fig. 1, with the locking means in operative position; Fig. 4 is an inside elevational view corresponding with Fig. 3; Fig. 5 is an inside elevational view of the diametrically opposite portion of the rim, that is, of the lower portion, as shown in Fig. 1, with the locking means in place; and Fig. 6 is a side elevational view corresponding with Fig. 5.

The construction of the felly 1 and felly-band 2, and the manner of mounting the tire-supporting rim on such felly-band are not of particular interest in the present connection, the means shown in Fig. 2 being merely typical. As there shown, the felly band is formed along one side with an inclined flange 3 adapted to receive the corresponding side of the rim, while a series of wedge members 4, or equivalent means, are adapted to be forced between the rim and band along the other side by nuts 5 on transversely disposed bolts 6, and thereby securely hold the rim in place.

The rim proper comprises two annular sections 7 and 8 with straight abutting edges, so that when said sections are brought into proper coöperative relation the rim is of the form clearly appearing in the several figures. Such assembled rim is adapted to seat in the space between the flange 3 and the wedge members or clips 4, but when thus seated, sufficient space is left between its inner surface and the felly band 2 for the locking means presently to be described. The edges 9, 9 of this tire supporting rim may be turned up to form flanges for directly engaging and securing a tire shoe, either of the straight-sided or clencher type, or they may be merely holding flanges adapted to retain reversible rings of familiar form, which are adapted to coöperate either with such Dunlop or clencher tires, as desired, thus rendering the rims universal as they are called in the trade. The form of rim edge shown in Fig. 2, by way of illustration, is for use with tires of the clencher type, as will be readily recognized. The two sections 7 and 8 of the rim are of different transverse widths, so that the line of separation between the two will be preferably located at one side of the center and thus leave a smooth surface for the inner tube of the tire to press against.

On the inner faces of the respective sections along their abutting edges, are provided two series of similarly shaped lugs 10, 110

10, that are adapted to be brought into register with each other when one section is in proper position relatively to the other. Such relative position is readily determined by providing a distinctive guide lug 11 at a suitable point on the one section 8, which is adapted to interlock with an aperture 12 formed in a laterally projecting plate 13 on the other section 9 (see Figs. 5 and 6). This plate constitutes the usual traction plate, with which demountable rims are regularly provided in order to non-rotatably secure the same onto the felly of the wheel, and the valve hole 14 also passes through such plate and rim at this point, as usual. At points on the rim-section 8 slightly removed from each side of this plate 13 are then rigidly attached the ends of substantially semi-circular, more or less resilient band parts 15, that are provided with a series of longitudinally extending slots 16 somewhat longer than the aforesaid lugs, and of a width just sufficient to take in two of the latter when brought into registering pairs, as previously described. These bands may be attached to the rim at the ends in question either by rivets 17 as shown, or by electric spot-welding, or otherwise, as found most convenient in practice. Said bands, furthermore, will normally tend to assume the position shown in Fig. 1, but when pressed outwardly against the rim sections their free ends will substantially meet at a point diametrically opposite from the traction plate 13, such bands then fitting tightly against the inner surface of the composite rim, as shown in Figs. 3 and 6. To secure such free ends in place, when the bands are thus forced outwardly against the rim sections, a pivotal latch 18 of the form shown in Fig. 4 is desirably employed, such latch having two cam-faces 19 which are undercut so as to fit over the ends and thus secure them against the rim sections, while at the same time the cam-faces press against such ends to wedge them apart and thus insure contact between the bands and the sections throughout the entire length of the former. The handle of the latch is provided with a projection 20 on its under side which is adapted to engage a depression 21 on the inner face on the rim-section to which it is pivotally attached, and thereby keep the latch in its locked position.

The mode of use of my improved rim should be readily understood. In order to secure a pneumatic tire on the same, the shoe of such tire, after the inner tube has been inserted therein, is slipped over the larger rim section 7 until its one bead engages the corresponding flange 9 carried by such section. Then the other rim-section 8 is brought into engagement with the remaining bead of the tire-shoe and the two sections of the rim are brought together, the correct relative position of such second section to the first being secured by bringing the lug 11 into line, and ready for engagement, with the aperture 12 in the traction-plate 13. Upon engaging these two elements the rim-sections are readily brought together with their pairs of lugs 10 in register, so that the two band parts 15 may be pressed outwardly into locking engagement with such pairs of lugs. When the bands are thus pressed outwardly, their free ends may be engaged by the pivotal latch 18 which serves to secure them fixedly in place and thus lock the rim-sections together. The inner tube of the tire may now be inflated and the rim, with its tire, is ready to be mounted on the wheel.

To remove the tire from the rim, after the latter has been taken from the wheel, it is merely necessary to turn the latch 18 so as to free the ends of the band parts 15, whereupon the latter will naturally tend to spring into the position shown in Fig. 1, or may be readily pried loose, if they show any tendency to stick. In the position shown in such Fig. 1, it is obvious that the two rim-sections may be directly separated without more ado, which indicates the ease and simplicity of the operation involved. To merely insert a new inner tube it will be unnecessary to completely remove the tire-shoe from the rim sections, since the latter, with the beads of such tire-shoes still in engagement therewith, may be separated far enough apart to allow the inner tube to be removed or introduced, as the case may be.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A tire-supporting rim for vehicle wheels including annular sections adapted to laterally abut and provided with corresponding engaging elements on their inner faces; two resilient, substantially semi-circular band parts having their adjacent ends rigidly attached to one of said rim-sections and adapted to be pressed outwardly against the same, said band parts being respectively provided with engaging elements complementary to those on said rim-sections and adapted to engage with the same to hold said rim sections against relative transverse movement.

2. A tire-supporting rim for vehicle wheels, including annular sections adapted to laterally abut and provided with corresponding, inwardly directed lugs; two resilient, substantially semi-circular band parts having their adjacent ends rigidly attached to one of said rim-sections and adapted to be pressed outwardly against the same, said band parts being respectively provided with a series of slots, each such slot being adapted to engage with a registering pair of said lugs and thereby hold said rim-sections against relative transverse movement.

3. A tire-supporting rim for vehicle wheels, including annular sections adapted to laterally abut and provided with corresponding, inwardly directed lugs; two substantially semi-circular band parts having their adjacent ends attached to one of said rim-sections and adapted to be pressed outwardly against the same, said band parts being respectively provided with a series of slots, each such slot being adapted to engage with a registering pair of said lugs and thereby hold said rim-sections against relative transverse movement; and means carried by one of said rim-sections, adapted to secure said band parts in engagement with said lugs.

4. A tire-supporting rim for vehicle wheels, including annular sections adapted to laterally abut and provided with corresponding, inwardly directed lugs; two substantially semi-circular band parts having their adjacent ends attached to one of said rim-sections and adapted to be pressed outwardly against the same, said band parts being respectively provided with a series of slots, each such slot being adapted to engage with a registering pair of said lugs and thereby hold said rim-sections against relative transverse movement; and a latch pivotally attached to one of said rim-sections at a point between the free ends of said band parts, said latch being adapted to simultaneously engage such ends and thereby secure said band parts in engagement with said lugs.

5. A tire-supporting rim for vehicle wheels, including annular sections adapted to laterally abut and provided with corresponding, inwardly directed lugs; two substantially semi-circular band parts having their adjacent ends attached to one of said rim-sections and adapted to be pressed outwardly against the same, said band parts being respectively provided with a series of slots, each such slot being adapted to engage with a registering pair of said lugs and thereby hold said rim-sections against relative transverse movement; and a latch pivotally attached to one of said rim-sections at a point between the free ends of said band parts, said latch having cam-faces adapted to simultaneously engage such ends and force the same apart, whereby said band parts are forced into engagement with said lugs.

6. A tire-supporting rim for vehicle wheels, including annular sections adapted to laterally abut and provided with corresponding, inwardly directed lugs; two substantially semi-circular band parts having their adjacent ends attached to one of said rim-sections and adapted to be pressed outwardly against the same, said band parts being respectively provided with a series of slots, each such slot being adapted to engage with a registering pair of said lugs and thereby hold said rim-sections against relative transverse movement; and a latch pivotally attached to one of said rim-sections at a point between the free ends of said band parts, said latch having cam-faces adapted to simultaneously engage such ends and force the same apart, whereby said band parts are forced into engagement with said lugs, the cam-faces on said latch being also undercut to secure said band parts in such engaging position.

7. A tire-supporting rim for vehicle wheels, including annular sections adapted to laterally abut and provided with corresponding, inwardly directed lugs; two substantially semi-circular band parts having their adjacent ends attached to one of said rim-sections and adapted to be pressed outwardly against the same, said band parts being respectively provided with a series of slots, each such slot being adapted to engage with a registering pair of said lugs and thereby hold said rim-sections against relative transverse movement; a laterally projecting plate on the same rim-section between the fixed ends of such band parts; and a lug on the other rim-section adapted to engage said plate when said rim-sections are in proper position with respect to each other for said corresponding lugs to register.

8. A tie-supporting rim for vehicle wheels, including annular sections adapted to laterally abut and provided with corresponding, inwardly directed lugs; two substantially semi-circular band parts having their adjacent ends attached to one of said rim-sections and adapted to be pressed outwardly against the same, said band parts being respectively provided with a series of slots, each such slot being adapted to engage with a registering pair of said lugs and thereby hold said rim-sections against relative transverse movement; a laterally projecting plate on the same rim-section between the fixed ends of such band parts; a lug on the other rim-section adapted to engage said plate when said rim-sections are in proper position with respect to each other for said corresponding lugs to register; and a latch pivotally attached to the same rim-section as said band parts and plate at a point between the free ends of said band parts, said latch being adapted to simultaneously engage such ends and thereby secure said band parts in engagement with said lugs.

9. In a tire-supporting rim for vehicle wheels, including annular sections adapted to laterally abut, the combination with corresponding, inwardly directed lugs provided on said rim sections respectively; of a resilient band rigidly attached at one end to one of said rim-sections and adapted to be pressed outwardly against the same, said band being provided with a series of slots, each such slot being adapted to engage with a registering pair of said lugs and thereby hold said rim-sections against relative transverse movement; and a latch pivotally attached to one of said rim-sections and adapted to secure said band in engagement with said lugs.

Signed by me, this 18 day of December, 1913.

CHARLES W. GRESSLE.

Attested by:—
C. J. LEITH,
M. H. WILLIAMS.